(12) United States Patent  
Radestock et al.

(10) Patent No.: US 7,461,057 B2  
(45) Date of Patent: Dec. 2, 2008

(54) QUERY PLAN EXECUTION BY IMPLEMENTATION OF PLAN OPERATIONS FORMING A JOIN GRAPH

(75) Inventors: Guenter Radestock, Karlsruhe (DE); Franz X. Faerber, Walldorf (DE); Christian M. Bartholomae, Oftersheim (DE)

(73) Assignee: SAP AG, Walldorf (DE)

( * ) Notice: Subject to any disclaimer, the term of this patent is extended or adjusted under 35 U.S.C. 154(b) by 236 days.

(21) Appl. No.: 11/322,626

(22) Filed: Dec. 30, 2005

(65) Prior Publication Data

US 2007/0156701 A1 Jul. 5, 2007

(51) Int. Cl.
G06F 7/00 (2006.01)
G06F 17/30 (2006.01)

(52) U.S. Cl. ............... 707/4; 707/2; 707/3; 707/8; 707/10

(58) Field of Classification Search .......... 707/203, 707/2, 3, 4, 8, 10
See application file for complete search history.

(56) References Cited

U.S. PATENT DOCUMENTS

| 5,506,984 | A  | * | 4/1996 | Miller | 707/10 |
|---|---|---|---|---|---|
| 5,590,321 | A  | * | 12/1996 | Lin et al. | 707/10 |
| 7,310,638 | B1 | * | 12/2007 | Blair | 707/4 |
| 2004/0030677 | A1 | * | 2/2004 | Young-Lai | 707/2 |

* cited by examiner

*Primary Examiner*—Apu Mofiz
*Assistant Examiner*—Chelcie Daye
(74) *Attorney, Agent, or Firm*—Mintz, Levin, Cohn, Ferris, Glovsky & Popeo, P.C.

(57) ABSTRACT

A system and method for executing a query plan are disclosed. In the system and method, a join graph is generated to represent the query plan. The join graph includes a set of plan operations that are to be executed for implementing the join graph. The query plan is received by a distributed network of a logical index server and one or more selected physical index servers. Each physical index server receives a portion of the plan operations, and determines what plan data is needed to execute the portion of the plan operations. A system and method includes a process for determining what plan data is needed from other physical index servers, or what plan data is needed by other physical index servers.

4 Claims, 4 Drawing Sheets

QUERY PLAN EXECUTION BY IMPLEMENTATION OF PLAN OPERATIONS FORMING A JOIN GRAPH

BACKGROUND

The execution strategy for a database query is called a query plan and may be represented as a graph. A query execution engine executes the plan by implementing the steps represented in the graph and delivering a set of results for the query.

A logical query plan describes an algorithm used to execute a particular query. In general the query execution plan for a query is more complicated than the join graph that describes how indexes or database tables in the query are connected. In addition to the connections in the join graph, the execution plan will usually contain additional nodes for projection and filter operations, and the same index may appear multiple times in the execution plan.

In a query plan graph, the nodes represent plan operations and part of the task of the execution engine is to orchestrate the execution of the plan operations on the available hardware. The plan operations may be individual search or join or aggregation or merge operations. The hardware may consist of a distributed landscape of hosts communicating by means of a protocol such as TCP/IP.

Increasingly, queries are being made to an information store that is distributed across a network of server computers and their associated databases. In a distributed network, communication among many servers to execute the plan operations of the join graph can become very complex and subject to too much latency. What is needed is a process for executing a query plan efficiently in a distributed network.

SUMMARY

Disclosed herein are systems and methods for generating and executing a query plan. The query plan can be represented as a join graph having plan operations as nodes. In a general aspect, a plan execution is as follows:

1. Establish a session object on each server that will execute at least one operation of the plan. Distribute the plan to all these servers.

2. On each server, count the number of references to each plan data object created or used on this server. The number of references is the number of plan operations on the same server that consume a plan data object plus the number of remote server that run at least one operation that consumes the data object.

3. On each server, start a thread for each plan operation to be executed on that server. Within the plan operation execution threads (1) wait for the inputs of the operation to become available, (2) execute the operation, (3) decrement the reference counts for the inputs, deleting inputs when their count reaches zero, (4) wake up threads that depend on the output of the operation 4. On each server, start a thread for each plan data object that will be consumed on the server and produced on a different server. Within the plan data request thread, (1) send a message to the session on the producing server requesting the data item, (2) receive the data item, (3) wake up threads waiting for the data item. The network request will create an additional thread on the producing server that waits for the data item and returns it to the requester.

5. Wait for all outputs of the execution plan to become available on the server executing the plan and return these outputs The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
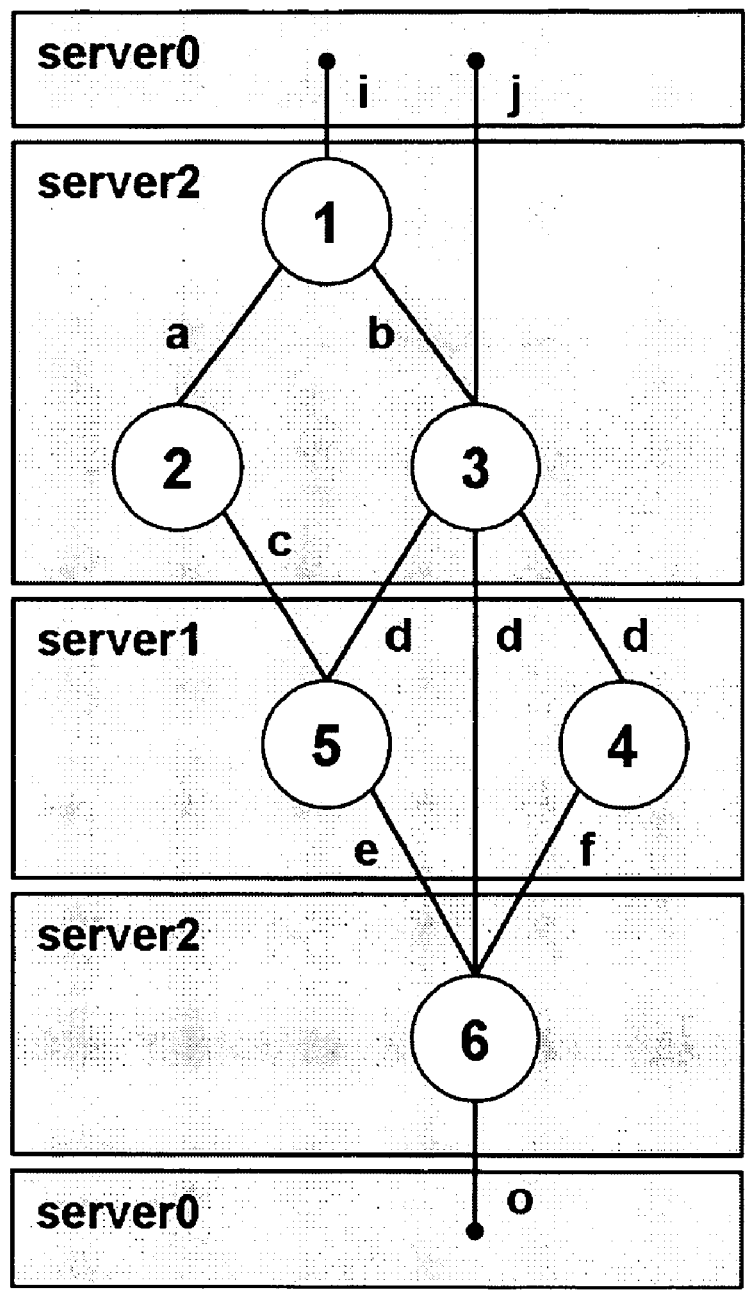
FIG. 1 illustrates a query plan represented as a join graph.

This document describes a system and method for generating and executing a query plan. The query plan can be represented as a join graph having plan operations as nodes. The following represents query plan variables and data that is operated on according to the exemplary query plan shown in FIG. 1:

| Host locations: | server0, server1, server2 |
| --- | --- |
| Connectors: | i, j, a, b, c, d, e, f, o |
| Plan operations (pops): | 1, 2, 3, 4, 5, 6 |
| Inputs: | value(i), value(j) |
| Outputs: | value(o) |
| Temporaries: | value(a), . . . , value(f) |

| Pop ID | Host | Inputs | Outputs |
| --- | --- | --- | --- |
| 1 | server2 | i | a, b |
| 2 | server2 | a | c |
| 3 | server2 | b, j | d |
| 4 | server1 | d | f |
| 5 | server1 | c, d | e |
| 6 | server2 | e, f, d | o |

Figure 2:
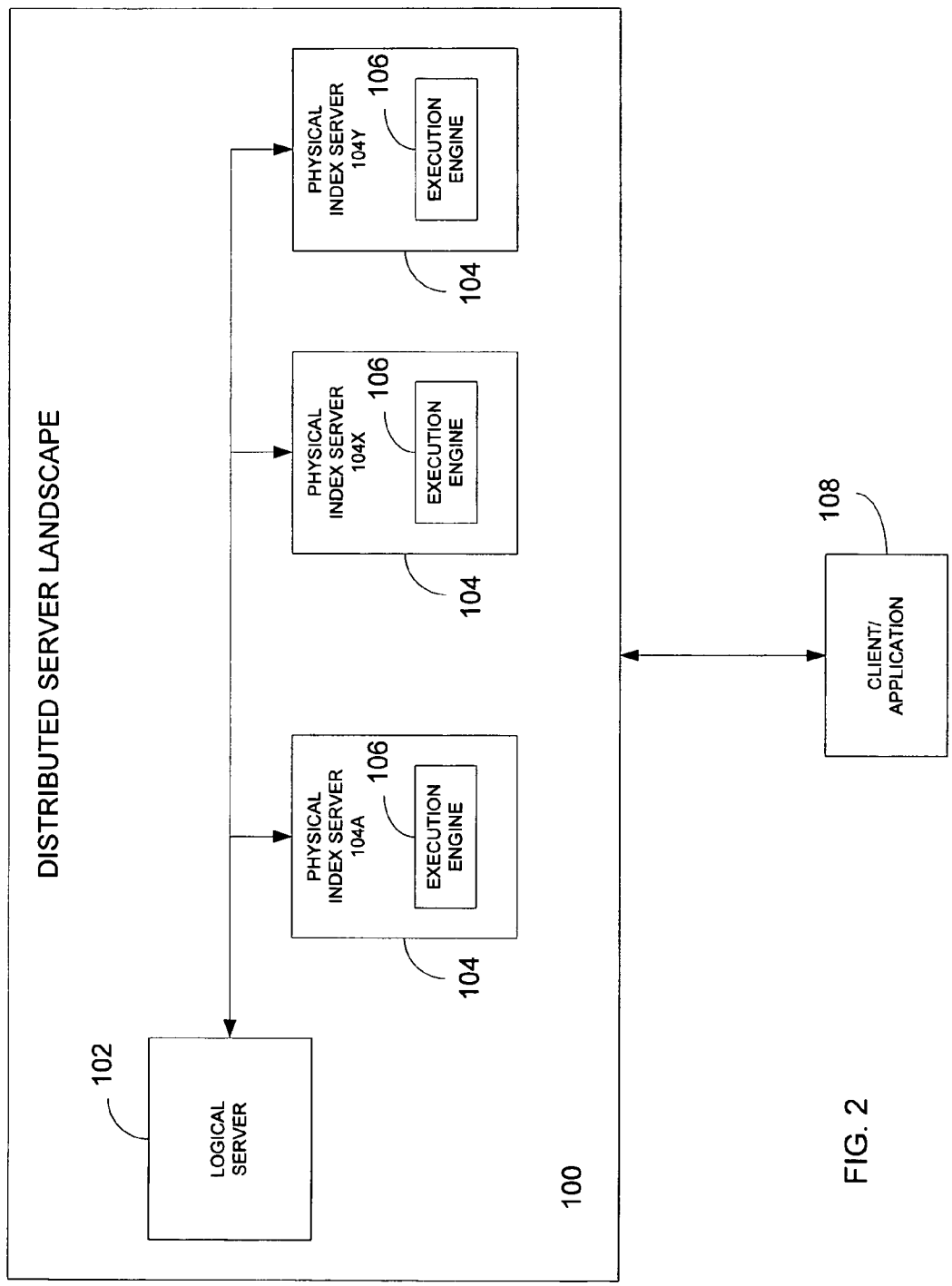
FIG. 2 is a block diagram of a system for executing the query plan.

In accordance with an exemplary embodiment, and as shown in FIG. 2, a system for executing the query plan includes a distributed server landscape 100. The distributed server landscape 100 includes a logical index server 102 and one or more physical index servers 104 (i.e. 104A . . . 104X, 104Y, etc.). Each physical index server 104 includes an execution engine 106, however alternatively, the execution engine 106 can be distributed across all or a portion of two or more physical index servers 104. The execution engine 106 coordinates execution of the query plan via the logical index server 102.

The execution engine 106 executes the query plan by implementing the steps of the join graph and delivering a set of results for the query. One task of the execution engine 106 is to orchestrate the execution of the plan operations on available hardware resources. The hardware resources may be a distributed network of host computers ("hosts") communicating according to a network communication protocol such as the transmission control protocol/internet protocol (TCP/IP). Each host can be a computer or computer program, such as a server.

The execution engine executes a query plan by arranging for the physical index servers 104 to perform the plan operations. Each physical index server 104 may be allocated a part or subset of the plan operations, to be performed in an order determined in part by any dependencies between the plan operations specified in the query plan. Once all of the plan operations have been performed, the execution engine 106 delivers a result set. More particularly, the execution engine 106 executes the query plan on the available physical index servers 104, synchronizes the plan operations that make up the query plan, and coordinates the network transfer of query parts, results, and temporary results. The execution engine 106 also creates threads as required by the operating systems running on the physical index servers 104, and calls one or more methods to calculate partial results and transfer data. The execution engine 106 manages any temporary results created during the execution.

Query plan operations include:

Search: Perform a search and return relevant document IDs or attribute values.

Join1Inwards: Build a dictionary and perform the first step of an inward join.

Join2Inwards: Rewrite the temporary reference table of an inward join.

Join3Inwards: Build the dimension function used for aggregation from the reference table.

Aggregate: Aggregate the results in the reference table and write the results to a hash table.

Merge: Merge hash tables (for use in a case of aggregating a distributed index).

BuildResult: Convert the hash table values using the dictionary and format the result.

Figure 3:
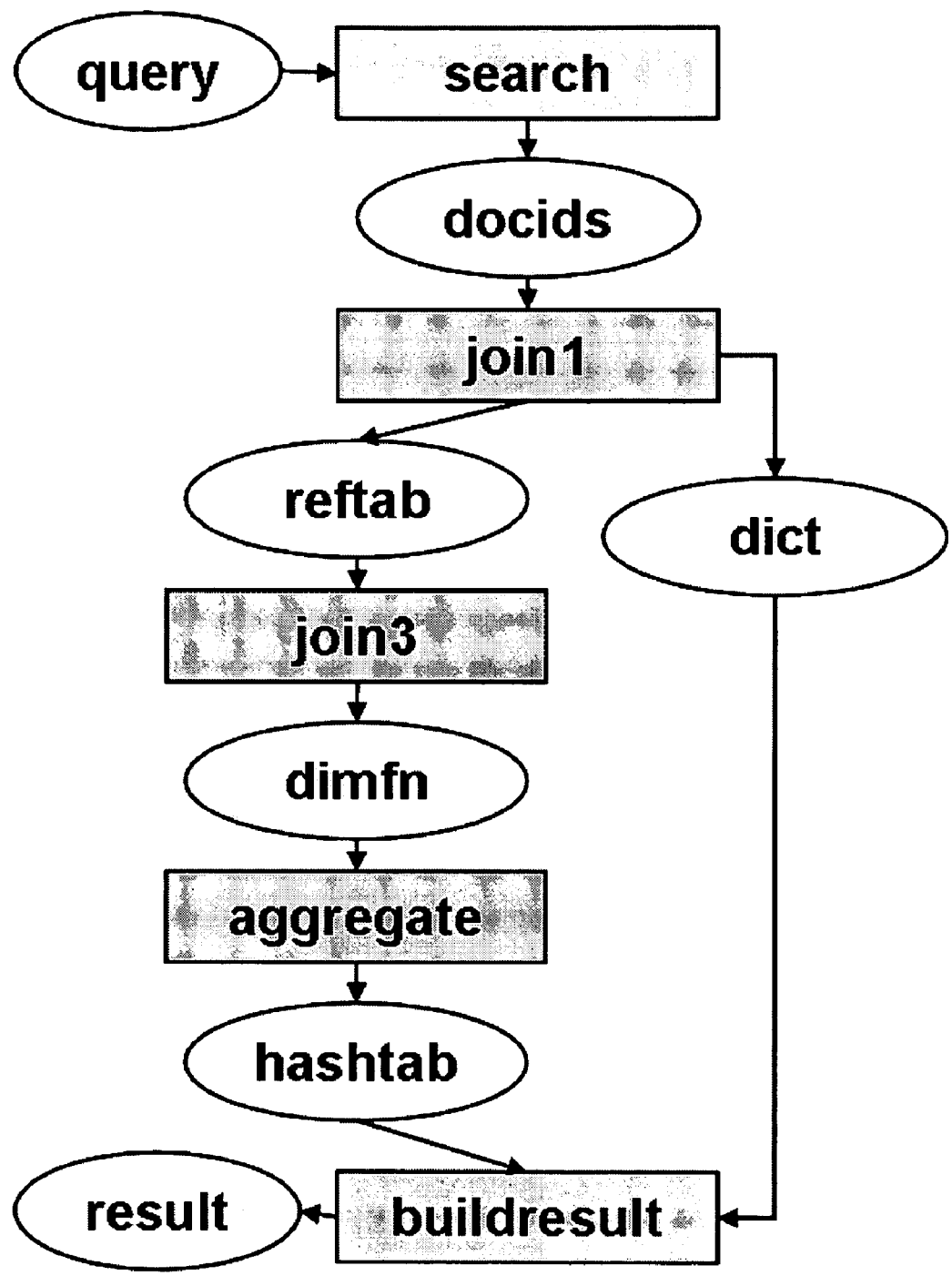
FIG. 3 illustrates a query plan execution process.

FIG. 3 illustrates a query plan execution process. The following are plan operation data values and their definition:

Predicate: A query, or a list of query entries (i.e. for example, the typical user input for a search).

Dictionary: A list of value IDs paired with values that can be referenced by an index.

RefTable: A reference table, an array of pairs (value, dictionary reference) ordered by value.

DimFn: A dimension function, an array of dictionary references.

HashTable: A list of tuples containing dictionary references and key figures.

Result: A result as passed back to the user or application calling the query.

To process Boolean queries, attributes are accessed individually and a query optimizer in the execution engine 106 selects an optimal way to execute the query. The result of a join operation is a dictionary and a dimension function. A fast merge join can be performed without sorting at any step. The coding is such that most of the values to be processed in a join are numbers, i.e. integers. For cache joins, the execution engine 106 employs distributed dimension function caching, where dimension functions are stored on the physical index servers 104 that use them.

To aggregate values, data is processed in chunks that are sized to optimize the use of processor caches. To merge aggregates, a merge operation that uses hashing is used. The merge operation does not need to sort the results from the aggregation operations. If identical hash functions are used in the aggregation operations, the partial results are ordered in accordance with the hash function values. To return the result, characteristics are transformed in a cache-sensitive manner. The result is serialized for fast transfer through a suitable connection to the user or application requesting the results.

Figure 4:
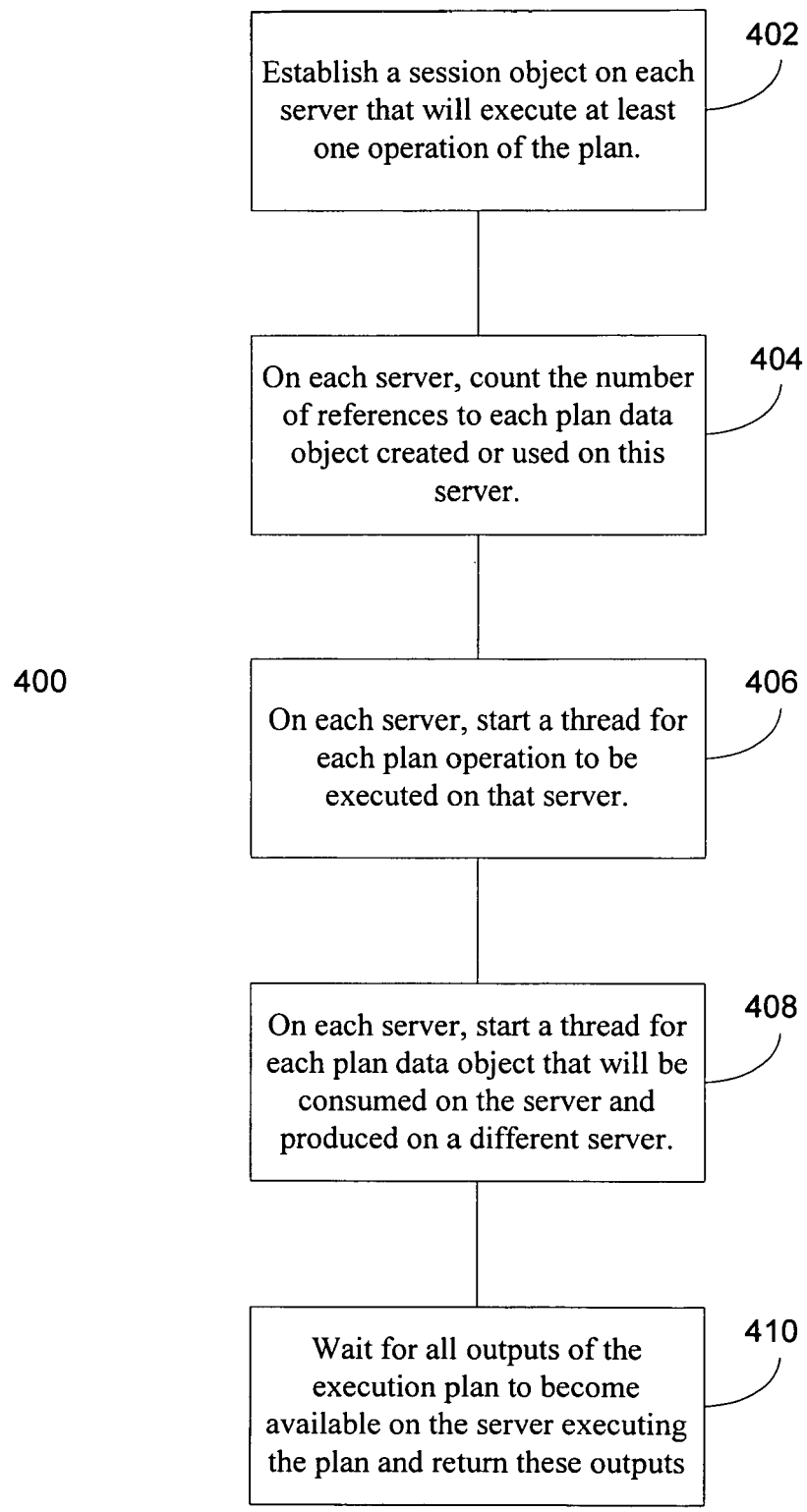
FIG. 4 is a flowchart of a method for query plan execution by implementation of plan operations forming a join graph.

In exemplary embodiments, the query plan is executed as follows and illustrated in FIG. 4. First, at 402 a session object is established on each server that will execute at least one operation of the plan. The plan is distributed to all these servers.

Second, on each server, at 404 the number of references to each plan data object created or used on this server is counted. The number of references is the number of plan operations on the same server that consume a plan data object plus the number of remote server that run at least one operation that consumes the data object.

Third, on each server, at 406 a thread is started for each plan operation to be executed on that server. Within the plan operation execution threads, the server: (1) waits for the inputs of the operation to become available, (2) executes the operation, (3) decrements the reference counts for the inputs, deleting inputs when their count reaches zero, and (4) wakes up threads that depend on the output of the operation.

Fourth, on each server, at 408 a thread is started for each plan data object that will be consumed on the server and produced on a different server. Within the plan data request thread, the server (1) sends a message to the session on the producing server requesting the data item, (2) receives the data item, and (3) wakes up threads waiting for the data item. The network request will create an additional thread on the producing server that waits for the data item and returns it to the requester. Fifth, at 410 all outputs of the execution plan are waited for to become available on the server executing the plan, and these outputs are returned by the server.

Different algorithms may be used to execute the query plan. For example, a simple scheme involving one execution thread per plan operation and index server has been implemented. The execution engine may be used for different tasks. Plan data and plan operation classes logically belong to the application that uses the execution engine, and not the execution engine itself.

The embodiments disclosed herein include the creation of a query execution plan that may be represented as a graph with plan operations as nodes and the implementation of plan execution in a distributed landscape. This method makes a clean separation between the logic of the query plan and the implementation issues that arise when the plan is implemented in a particular server landscape.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A system for executing a query plan, the system comprising:
    a logical index server configured to receive the query plan;
    one or more physical index servers in communication with the logical index server, each physical index server configured to receive a portion of the query plan from the logical index server, and determine plan operations of the portion of the query plan; and
    an execution engine associated with each of the one or more physical index servers, the execution engine configured to execute the plan operations of the query plan to generate a result, the execution engine executing plan operations specified by a query plan by initiating operations comprising:
        establishing a session object on each of the index servers;
        distributing the query plan to each of the index servers;
        counting, at each of the index servers, a number of references corresponding to a number of plan operations on such index server that consume a plan data object plus a number of remote index servers that run at least one operation that consumes the plan data object;
        initiating, at each of the index servers, a plan operation execution thread for each plan operation to be executed on such index server, within such plan operation execution thread, the server waits for inputs of the plan operation to become available, executes the operation, decrements reference counts for the inputs and deletes inputs when their reference count reaches zero, and wakes up plan operation execution threads that depend on an output of the plan operation;

initiating, at each of the index servers, a plan data request thread for each plan data object that will be consumed on such server and produced on a different index server, within such plan data request, the server sends a message to the session object on the producing index server requesting a data item, receives the data item, and wakes up plan data request threads waiting for the data item; and returning, by each index server to the logical server, all outputs of the execution plan when the corresponding outputs become available on such index server.

2. A system in accordance with claim 1, wherein the execution engine is distributed among the one or more physical index servers.

3. A computer-implemented method for executing plan operations specified by a query plan, configured with a logical index server to receive the query plan, one or more physical index servers in communication with the logical index server, each physical index server configured to receive a portion of the query plan from the logical index server, and determine plan operations of the portion of the query plan, and an execution engine associated with each of the one or more physical index servers, the execution engine configured to execute the plan operations of the query plan to generate a result, the method comprising:

establishing a session object on a plurality of servers used to execute at least one plan operation;

distributing the query plan to each of the server;

counting, at each of the servers, a number of references corresponding to a number of plan operations on such server that consume a plan data object plus a number of remote servers that run at least one operation that consumes the plan data object;

initiating, at each of the servers, a plan operation execution thread for each plan operation to be executed on such server, within such plan operation execution thread, the server waits for inputs of the plan operation to become available, executes the operation, decrements reference counts for the inputs and deletes inputs when their reference count reaches zero, and wakes up plan operation execution threads that depend on an output of the plan operation;

initiating, at each of the servers, a plan data request thread for each plan data object that will be consumed on such server and produced on a different server, within such plan data request, the server sends a message to the session object on the producing server requesting a data item, receives the data item, and wakes up plan data request threads waiting for the data item; and returning, by each server, all outputs of the execution plan when the corresponding outputs become available on such server.

4. A computer-readable tangible storage medium containing a set of instructions for a distributed server network of a plurality of servers, configured with a logical index server to receive a query plan, one or more physical index servers in communication with the logical index server, each physical index server configured to receive a portion of the query plan from the logical index server, and determine plan operations of the portion of the query plan, and an execution engine associated with each of the one or more physical index servers, the execution engine configured to execute the plan operations of the query plan to generate a result, wherein the set of instructions causing the distributed server network to:

executing plan operations specified by a query plan by:

establishing a session object on a plurality of servers used to execute at least one plan operation;

distributing the query plan to each of the servers;

counting, at each of the servers, a number of references corresponding to a number of plan operations on such server that consume a plan data object plus a number of remote servers that run at least one operation that consumes the plan data object;

initiating, at each of the servers, a plan operation execution thread for each plan operation to be executed on such server, within such plan operation execution thread, the server waits for inputs of the plan operation to become available, executes the operation, decrements reference counts for the inputs and deletes inputs when their reference count reaches zero, and wakes up plan operation execution threads that depend on an output of the plan operation;

initiating, at each of the servers, a plan data request thread for each plan data object that will be consumed on such server and produced on a different server, within such plan data request, the server sends a message to the session object on the producing server requesting a data item, receives the data item, and wakes up plan data request threads waiting for the data item; and returning, by each server, all outputs of the execution plan when the corresponding outputs become available on such server.

* * * * *